United States Patent [19]

Johnson et al.

[11] 4,129,465
[45] Dec. 12, 1978

[54] SMOKE-GENERATING COMPOSITION

[75] Inventors: Duane M. Johnson, Loogootee; Henry A. Webster, III, Ellettsville, both of Ind.

[73] Assignee: The United States of America as represented by the Secretary of the Navy, Washington, D.C.

[21] Appl. No.: 817,896

[22] Filed: Jul. 21, 1977

[51] Int. Cl.² .......................... C06B 45/10; C06D 3/00
[52] U.S. Cl. .................................. 149/19.3; 149/19.1; 149/20; 149/22; 149/30
[58] Field of Search ....................... 149/19.1, 20, 19.3, 149/29, 22, 30

[56] References Cited

U.S. PATENT DOCUMENTS

| 3,617,403 | 11/1971 | Johnson | 149/19.3 |
| 3,650,856 | 3/1972 | Artz | 149/30 |
| 3,705,828 | 12/1972 | Voigt et al. | 149/30 |
| 3,734,788 | 5/1973 | Kaufman | 149/19.3 |
| 3,884,734 | 5/1975 | Palmer et al. | 149/29 |

*Primary Examiner*—Edward A. Miller
*Attorney, Agent, or Firm*—R. S. Sciascia; Paul S. Collignon

[57] ABSTRACT

A smoke producing composition comprised of about 50 percent of phosphorus, between 37 and 44 percent of calcium sulfate, between 3 and 10 percent of boron and about 3 percent of a binder.

8 Claims, No Drawings

SMOKE-GENERATING COMPOSITION

BACKGROUND OF THE INVENTION

The present invention relates to a pyrotechnic composition which, when burned, will produce a dense smoke particularly adapted for military purposes, such as for signaling or for camouflage.

Chemicals in the category of screening smokes are those which, when dispersed in air, produce a cloud of finely divided particles of solid, liquid, or both. These are used to shield tactical operations or disrupt the movements of the enemy. Outstanding examples of such materials are: fuel oil used in "artificial fog" generators, white phosphorus, sulfur trioxide, titanium tetrachloride, and so called zinc chloride smokes. Each of the above-listed smoke-generating compositions is characterized by certain advantages and disadvantages in military operations, depending upon the importance of such factors as mobility of the smoke producing apparatus, toxicity, logistical considerations, and the total obscuring power of the composition employed.

For military use, volatile hygroscopic chloride (HC) smokes are the most important, other than oil mixtures, which are utilized for large scale operations. The most widely used HC types of smokes are those resulting in the production of zinc chloride smokes.

The original mixture employed to produce a zinc chloride smoke was the Berger mixture, developed by the French Army during World War I. The original Berger mixture consisted of zinc dust and carbon tetrachloride with zinc oxide and diatomite. Upon ignition, a vigorous reaction takes place, resulting in the formation of zinc chloride, which is volatilized by the heat of the reaction and solidifies to form smoke. However, since this mixture employed a liquid organic chloride, it was difficult to transport and store. By the beginning of World War II, the United States Government had developed a mixture designated "HC smoke mixture" which contained zinc, a perchlorate as an oxidizing agent, hexachloroethane as the organic chloride compound, with a retarder, ammonium chloride. Subsequently, a mixture was found which was better in many ways than the original; it was a combination of hexachloroethane, aluminum and zinc oxide. This mixture required no stabilizer against moisture absorption, and changing the percentage of aluminum varied the burning time, as desired. However, these compositions are corrosive and will interfere with firing mechanisms, thereby materially limiting the storage life of the smoke-generating composition.

More recently developed pyrotechnic devices in use by the military use red phosphorus compositions, and a typical red phosphorus composition contains 51% phosphorus, 35% pyrolusite (MnO$_2$), 8% magnesium, 3% ZnO and 3% binder. When this composition is ignited, the magnesium and MnO$_2$ react as a thermite to generate heat and vaporize the phosphorus. The phosphorus vapor then burns in the surrounding atmosphere to produce a dense white smoke and a yellow flame. The phosphorus composition is typically long burning with an average rate of 2.42 × 10$^{-2}$ cm/sec.

Another smoke composition containing red phosphorus is described in U.S. Pat. No. 3,607,472, which issued Sept. 21, 1971, to Bernard E. Douda. This patent describes a white smoke producing composition comprised of between 8 and 12 percent of magnesium, between 30 and 34 percent of magnesium dioxide, between 0 manganese 3 percent of zinc oxide, between 0 and 4 percent of lead dioxide, between 38 and 45 percent of red phosphorus and between 10 and 18 percent of a resinuous binder.

The phosphorus compositions presently being used by the military suffer from two basic problems. One problem is that one of the key ingredients, pyrolusite (MnO$_2$), is not mined in the United States and thus is a foreign-supplied material. The pyrolusite which is presently used is an ore and has as much as 20 percent impurities.

A second and more severe problem with presently used phosphorus compositions is the production of hydrogen in the sealed pyrotechnic devices. This problem is caused by the reaction of magnesium with water trapped in the device during production for it is known that magnesium reacts with water according to the equation:

$$Mg + 2H_2O \rightarrow Mg(OH)_2 + H_2 \quad (1)$$

The reaction rate is increased at higher temperatures and the generation of hydrogen in a sealed pyrotechnic system leads to severe pressure build-ups which can result in explosion and accidental ignition of the units. Such a reaction could produce catastrophic results, particularly aboard a ship where large quantities of munitions might be stored.

SUMMARY OF THE INVENTION

The present invention relates to a smoke-producing composition which does not contain any magnesium and thus prevents any undesired production of hydrogen during storage and, additionally, does not contain any pyrolusite which must be procured from foreign sources.

The composition of the present invention is comprised of phosphorus, calcium sulfate, boron and a binder.

It is therefore a general object of the present invention to provide a smoke-producing composition which can be stored at elevated temperatures without causing any untoward reaction.

Another object of the present invention is to provide a smoke-producing composition which can be made from readily available materials.

Other objects, advantages and novel features of the present invention will become apparent from the following detailed description of the invention.

DESCRIPTION OF THE PREFERRED EMBODIMENT

Pyrotechnic candles were made from a phosphorus composition which contained no pyrolusite and no magnesium. The composition contained boron as the fuel and calcium sulfate as the oxidizer. Boron was chosen as the fuel as it does not react readily with water, thus eliminating the hydrogen generation problem in candles having magnesium.

The candles of the present invention were made by a process called wet mixing. In this process, a mixture of the ingredients is made in a binder/solvent solution. When the ingredients are thoroughly combined, a non-solvent is added. The addition of the non-solvent causes the polymer to precipitate and coat the solid ingredients in the solution with binder. The excess solvent and non-solvent are then evaporated leaving an intimate mixture of the ingredients coated with the polymer.

This mixing technique was chosen because it is somewhat safer than other processing techniques.

The following examples are provided in order to illustrate the present invention.

EXAMPLE I

|  | Percent (By Weight) |
|---|---|
| Phosphorus | 50 |
| Calcium Sulfate | 44 |
| Boron | 3 |
| Fluorocarbon Rubber (Viton A) | 3 |

Fluorocarbon rubber was used as a binder and was procured from E. I. DuPont de Nemours Company under the trade name Viton A. Viton A has the formula $(C_3H_2F_4)_x$, and is comprised of about 32.1 percent of carbon, about 1.8 percent of hydrogen, and about 66.1 percent of florine. The Viton A was dissolved in acetone and the phosphorus, boron and calcium sulfate were added to this mixture. Hexane was then added to the solvent mixture until the polymer-coated ingredients precipitated. The acetone and hexane were dried with calcium chloride prior to use. The mixture was then dried and candles were made by pressing the composition into fishpaper tubes. The candles were 12.7 cm long, 4.45 cm in diameter and contained 300 grams of composition. A standard ignition composition was pressed on the surface of each candle and, upon burning, a yellow flame and a dense white smoke were produced. The candles had a burn rate of $2 \times 10^{-2}$ cm/sec.

EXAMPLE II

|  | Percent (By Weight) |
|---|---|
| Phosphorus | 50 |
| Calcium Sulfate | 42 |
| Boron | 5 |
| Fluorocarbon Rubber (Viton A) | 3 |

The ingredients were blended as in EXAMPLE I and candles were made by pressing the composition into fishpaper tubes. The candles were 12.7 cm long, 4.45 cm in diameter and contained 300 grams of composition. The standard ignition composition listed in EXAMPLE I was pressed on the surface of each candle and, upon burning, a yellow flame and a dense white smoke were produced. The candles had a burn rate of 2.7 cm/sec.

EXAMPLE III

|  | Percent (By Weight) |
|---|---|
| Phosphorus | 50 |
| Calcium Sulfate | 37 |
| Boron | 10 |
| Fluorocarbon Rubber (Viton A) | 3 |

The ingredients were blended as in EXAMPLE I and candles were made by pressing the composition into fishpaper tubes. The candles were 12.7 cm long, 4.45 cm in diameter and contained 300 grams of composition. The standard ignition composition listed in EXAMPLE I was pressed on the surface of each candle and, upon burning, a yellow flame and a dense white smoke were produced. The candles had a burn rate of 3.2 cm/sec.

It can thus be seen that the smoke compositions of the present invention, upon burning, provide a dense white smoke comparable to the smoke produced by pyrotechnic candles having magnesium as a fuel and pyrolusite as an oxidizer. The smoke composition of the present invention can be made from readily available materials and, as no magnesium is present, the composition, when stored in a closed environment, does not produce hydrogen.

Obviously many modifications and variations of the present invention are possible in the light of the above teachings. It is therefore to be understood that the invention may be practiced otherwise than as specifically described.

We claim:

1. A smoke-generating composition comprised, by weight, of
   about 50 percent of phosphorus
   between 37 and 44 percent of calcium sulfate,
   between 3 and 10 percent of boron, and
   about 3 percent of a binder.

2. A smoke-generating composition as set forth in claim 1 wherein said binder is fluorocarbon rubber.

3. A smoke-generating composition comprised, by weight, of
   about 50 percent of phosphorus,
   about 44 percent of calcium sulfate,
   about 3 percent of boron, and
   about 3 percent of a binder.

4. A smoke-generating composition as set forth in claim 3 wherein said binder is fluorocarbon rubber.

5. A smoke-generating composition comprised, by weight, of
   about 50 percent of phosphorus,
   about 42 percent of calcium sulfate,
   about 5 percent of boron, and
   about 3 percent of a binder.

6. A smoke-generating composition as set forth in claim 5 wherein said binder is fluorocarbon rubber.

7. A smoke-generating composition comprised, by weight, of
   about 50 percent of phosphorus,
   about 37 percent of calcium sulfate,
   about 10 percent of boron, and
   about 3 percent of a binder.

8. A smoke-generating composition as set forth in claim 7 wherein said binder is fluorocarbon rubber.

* * * * *